US012754675B2

(12) United States Patent
Liu et al.

(10) Patent No.: US 12,754,675 B2
(45) Date of Patent: Oct. 6, 2026

(54) DETERMINING GROWN BAD BLOCK ALLOWANCE ASSOCIATED WITH A MEMORY DEVICE

(71) Applicant: Micron Technology, Inc., Boise, ID (US)

(72) Inventors: Yang Liu, San Jose, CA (US); Fanqi Wu, Sunnyvale, CA (US); Aaron Lee, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/790,369

(22) Filed: Jul. 31, 2024

(65) Prior Publication Data

US 2026/0037136 A1 Feb. 5, 2026

(51) Int. Cl.
*G06F 3/06* (2006.01)

(52) U.S. Cl.
CPC ............ *G06F 3/0613* (2013.01); *G06F 3/064* (2013.01); *G06F 3/0679* (2013.01)

(58) Field of Classification Search
CPC ....... G06F 3/0613; G06F 3/064; G06F 3/0679
See application file for complete search history.

(56) References Cited

U.S. PATENT DOCUMENTS

| | | | | |
|---|---|---|---|---|
| 9,766,980 | B1 * | 9/2017 | Anantharaman | G06F 11/1076 |
| 11,061,768 | B1 | 7/2021 | Alrod et al. | |
| 11,074,173 | B1 | 7/2021 | Gordon | |
| 2019/0286341 | A1 * | 9/2019 | Hou | G06F 3/0617 |
| 2019/0354293 | A1 | 11/2019 | Kwon et al. | |
| 2021/0247924 | A1 | 8/2021 | Seo et al. | |
| 2022/0283720 | A1 * | 9/2022 | Kim | G06F 3/0659 |
| 2023/0195356 | A1 * | 6/2023 | Luo | G06F 3/0655 711/154 |
| 2024/0143170 | A1 | 5/2024 | Lakshmi et al. | |

OTHER PUBLICATIONS

International Search Report and Written Opinion for International Application No. PCT/US2025/039962, mailed Nov. 25, 2025, 9 Pages.

* cited by examiner

*Primary Examiner* — Arpan P. Savla
*Assistant Examiner* — Jason Michael Pinga
(74) *Attorney, Agent, or Firm* — Lowenstein Sandler LLP

(57) ABSTRACT

A processing device determines, during a pre-runtime stage associated with a memory device, a first relationship comprising a first modeling of a first parameter of the memory device and a second parameter of the memory device. During the pre-runtime stage, a grown bad block allowance is determined based on the first relationship associated with the memory device. The grown bad blocks allowance is stored in a storage location associated with the memory device, where the memory device uses the grown bad blocks allowance during runtime.

20 Claims, 6 Drawing Sheets

DETERMINING GROWN BAD BLOCK ALLOWANCE ASSOCIATED WITH A MEMORY DEVICE

TECHNICAL FIELD

Embodiments of the disclosure relate generally to memory sub-systems, and more specifically, relate to determining, during a characterization process associated with a memory device, a grown bad block allowance associated with the memory device based on one or more memory device requirements subject to degradation during a runtime lifecycle of the memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
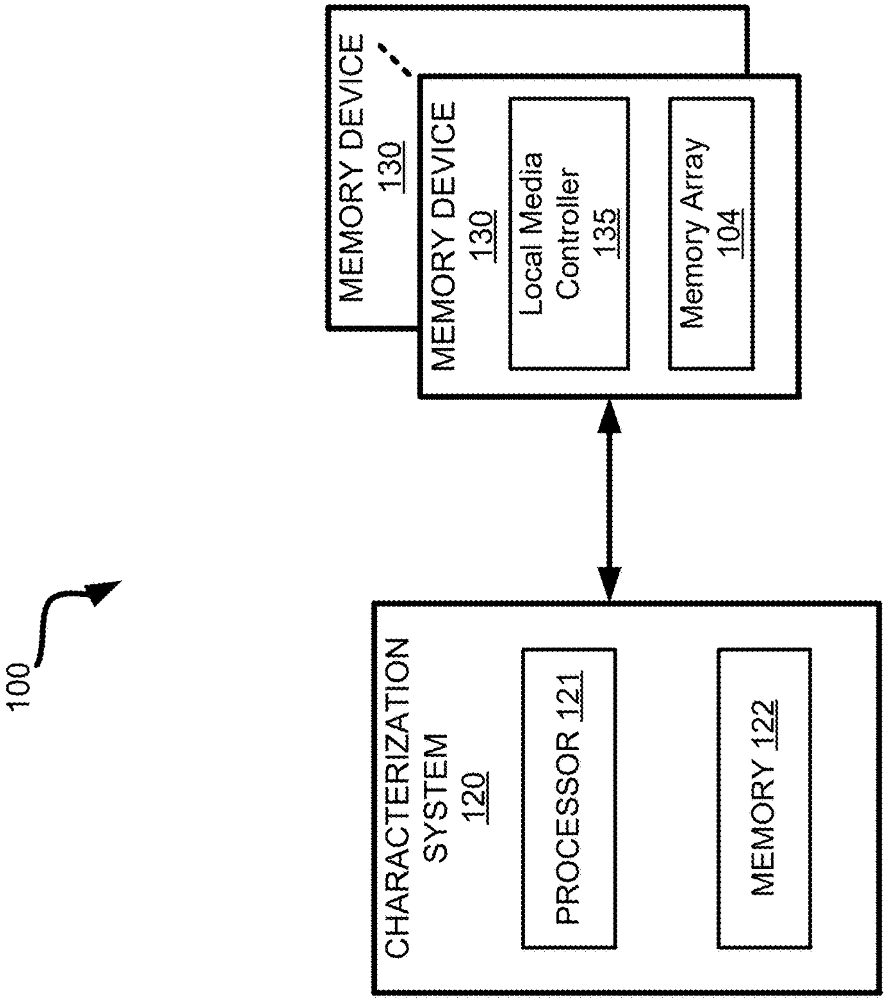
FIG. 1 illustrates an example computing system that includes a characterization system in accordance with one or more embodiments of the present disclosure.

Aspects of the present disclosure are directed to determining a grown bad block allowance associated with a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include multiple memory cells arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. A given segment of one of those memory devices (e.g., a block) can be characterized based on the programming state of the memory cells associated with wordlines contained within the segment. Some memory devices use certain types of memory cells, such as quad-level cell (QLC) memory cells, which store four bits of data in each memory cell, which make it affordable to move more applications from legacy hard disk drives to newer memory sub-systems, such as NAND solid-state drives (SSDs). QLC memory is particularly well-tuned for read-intensive workloads, which are often seen in data center applications where data is normally generated once, and then read regularly to perform calculations and analysis. Thus, QLC memory is often considered to be fragile and used only for very light write workloads, as the endurance and Quality of Service (QoS) can limit usability in data center applications.

During a characterization or manufacturing stage, one or more memory devices (e.g., one or more memory dies of a memory package) undergo analysis and testing to establish various settings, values, or requirements associated with multiple parameters of the one or more memory devices. The one or more memory devices are characterized using probes at a beginning-of-life (BOL) stage and a model (e.g., an artificial intelligence model) is employed to categorize the memory devices based on the BOL characterization and one or more requirements and target specifications (e.g., customer-derived specifications).

In this characterization stage, the performance requirements and target specification metrics identified can be used to set allowances associated with parameters to satisfy quality of service (QoS) requirements associated with each memory device of the multiple memory devices. One such parameter associated with the performance of the memory device during usage of the memory device is a grown bad block (GBB) allowance, which identifies a maximum tolerable number of memory blocks that can be identified as "bad" or unusable due to wear and tear experienced during the lifecycle of the memory device (e.g., from the BOL stage to an end-of-life (EOL) stage) such that the desired QoS requirement is maintained.

However, characterization implementation systems establish the GBB allowance (i.e., a GBB allowance value or threshold) during the BOL stage of the memory device in a manner which is not aligned with relationships with performance metrics associated with system usage and the corresponding degradation of the one or more memory devices from the BOL stage to the EOL stage. Accordingly, current approaches to establishing the GBB allowance result in the inaccurate and inefficient setting of this parameter which negatively impacts the QoS of the memory device.

Aspects of the present disclosure address the above and other deficiencies by implementing a characterization process during a pre-runtime stage associated with a memory device (e.g., a memory die) to establish a GBB allowance for the memory device based on relationships of parameters impacted by degradation during a lifecycle of the memory device (e.g., from a BOL stage of the memory device to an EOL stage of the memory device). According to embodiments, execution of the characterization process includes a determination of a first parameter associated with the memory device (e.g., a memory die) and a second parameter associated with the memory device based on a performance specification associated with the memory device. In an embodiment, the first parameter and the second parameter are performance metrics that are impacted by degradation during the lifecycle (e.g., from BOL to EOL) of the memory device.

In an embodiment, the first parameter is a throughput metric associated with one or more memory access operation types (e.g., a host system throughput associated with a number of random writes executable by the memory device based on requests received from a host system). In an embodiment, the second parameter is a write amplification associated with the media access operation workload type (e.g., a WA level associated with a 4K random write operation type) associated with the throughput metric the memory device. The write amplification (WA) represents an actual amount of information or data written to a memory device compared to a logical amount of write data sent to the memory device by the host system. In an embodiment, the characterization process includes determining a first relationship between the first parameter (e.g., the throughput metric associated with a media access operation workload type) and the second parameter (e.g., the WA). In an embodiment, the first relationship represents a modeling of the first parameter as a function of the second parameter (e.g., mapping the throughput metric versus WA).

In an embodiment, the characterization process includes determining a second relationship associated with multiple parameters of the memory device. In an embodiment, the second relationship is determined between a number of valid blocks of the memory die and the WA (i.e., the WA associated with the media access operation workload type associated with the first parameter) of the memory device. In an embodiment, the number of valid blocks (NVB) represents a minimum number of memory blocks that are required to remain valid and capable of storing data in order to maintain target QoS requirements. In an embodiment, a modeling or mapping between the WA and an effective over-provisioning percentage (e.g., a percentage of the logical capacity of a memory device and a raw capacity of the memory device) may be established. In an embodiment, the effective over-provisioning percentage can be further mapped to the NVB of the memory die, and this mapping can be used to determine the second relationship (i.e., the relationship between the NVB of the memory device and the WA of the memory device). In an embodiment, the second relationship represents a modeling of the NVB of the memory device as a function of the WA of the memory device (e.g., mapping the NVB versus WA).

According to embodiments, the characterization process includes determining a third relationship based on the first relationship and the second relationship. In an embodiment, the third relationship is determined between the throughput metric level associated with the memory die and the number of valid blocks (NVB) of the memory die. In an embodiment, the third relationship may be modeled or plotted to represent the throughput metric (e.g., plotted on a Y axis of a graph) and the NVB (e.g., plotted on an X axis of the graph). In an embodiment, a curve representing the third relationship may be modeled or plotted as a monotonically increasing curve. In an embodiment, the characterization process includes determining a largest or steepest slope or portion (i.e., the gradient of the throughput metric level and the number of NVB) along the curve corresponding to a threshold throughput loss level (e.g., a percentage decrease of the throughput level). According to embodiments, the characterization process identifies the portion of the curve having a steepest slope level corresponding to the threshold throughput loss level. According to embodiments, the portion of the curve having the steepest slope level corresponds to a loss of the throughput level equal to the threshold throughput loss level over a smallest range of the NVB.

According to embodiments, the characterization process including identifying a first NVB value (e.g., NVB X) corresponding to a start point of the identified portion of the curve (i.e., the steepest slope curve portion) and a second NVB value (e.g., NVB Y) corresponding to an end point of the identified portion of the curve. In an embodiment, the characterization process determines a difference between the first NVB value and the second NVB value.

In an embodiment, the characterization process determines a range of the host system throughput that corresponds to a threshold throughput loss level. Using the identified range, the characterization process identifies a first NVB value corresponding to a start point of the range and a second NVB value corresponding to an end point of the range.

In an embodiment, the characterization process includes establishing a grown bad block (GBB) allowance associated with the memory die based on the difference between the first NVB value and the second NVB value. In an embodiment, the determined GBB allowance is caused to be stored in a storage location associated with the memory device (e.g., as a trim value) for use during the runtime implementation of the memory device.

Advantageously, the GBB allowance for the memory device is established based on performance requirements associated with the memory device (e.g., memory die). Accordingly, establishing the GBB allowance value based on the performance requirements relationships, as described herein, results in an improved alignment between the memory device characterization and the runtime usage of the memory device.

FIG. 1 illustrates an example computing system 100 that includes a characterization system 120 configured to perform a characterization process during a pre-runtime stage to establish one or more requirements associated with each of one or more memory devices 130 (e.g., one or more memory dies). In an embodiment, the characterization system 120 performs the characterization process to establish or define values or requirements associated with the memory device 130 during a manufacturing or characterization stage (i.e., prior to implementation of the memory device 130 in a memory sub-system operatively coupled to a host system in a runtime environment). In an embodiment, each memory device 130 can include one or more memory dies.

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The characterization system 120 of a processor 121 and an operatively coupled memory 122. The memory 122 can store instructions that when executed by the processor 121 cause the characterization manager 122 to perform operations of a characterization process associated with the memory device 130, as described in detail herein. In some embodiments, the characterization system 120 is coupled to different types of memory devices 130. FIG. 1 illustrates one example of a characterization system 120 coupled to one or more memory devices 130. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The one or more memory devices 130 can include any combination of the different types of non-volatile memory devices and/or volatile memory devices. Some examples of non-volatile memory devices (e.g., memory device(s) 130) include not-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the one or more memory devices 130 can include one or more arrays of memory cells 104. One type of memory cell, for example, single level cells (SLC) can store one bit per cell. Other types of memory cells, such as multi-level cells (MLCs), triple level cells (TLCs), quad-level cells (QLCs), or penta-level cells (PLCs) can store multiple bits per cell. In some embodiments, each of the one or more memory devices 130 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, electrically erasable programmable read-only memory (EEPROM).

In some embodiments, each of the one or more memory devices 130 include local media controllers 135 that operate in conjunction with a memory sub-system controller to execute operations on one or more memory cells of the memory device(s) 130 when in a runtime environment (i.e., following completion of the characterization stage). In some embodiments, each of the one or more memory devices 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single memory die having some control logic (e.g., local media controller 135) embodied thereon.

According to embodiments, the characterization system 120 executes a characterization process during a characterization stage associated with each of the one or memory devices 130. In an embodiment, the characterization system 120 executes the characterization process to define or establish a grown bad block (GBB) allowance for each of the one or more memory devices 130 based on relationships between parameters impacted by degradation during a lifecycle of the memory device (e.g., from a BOL stage of the memory device to an EOL stage of the memory device). According to embodiments, the characterization system 120 executes the characterization process to identify a first relationship between a first parameter associated with the memory device 130 (e.g., a memory die) and a second parameter associated with the memory device based on a performance specification associated with the memory device (e.g., a customer-directed specification or performance requirements for the memory device).

In an embodiment, the first parameter is a throughput metric level associated with one or more memory access operation types (e.g., a host system throughput associated with a number of random writes executable by the memory device based on requests received from a host system). In an embodiment, the second parameter is a write amplification associated with the media access operation workload type (e.g., a 4K random write operation type) corresponding to the throughput metric level of the memory device. The write amplification (WA) represents an actual amount of information or data written to a memory device compared to a logical amount of write data sent to the memory device by the host system. In an embodiment, the characterization process includes determining a first modeling of a first relationship between the first parameter (e.g., the throughput metric) and the second parameter (e.g., the WA).

In an embodiment, the characterization system 120 determines a second relationship between a number of valid blocks (NVB) of the memory die and the WA level (i.e., the second parameter) of the memory device 130. In an embodiment, the number of valid blocks represents a minimum number of memory blocks that are required to remain valid and capable of storing data in order to maintain target QoS requirements. In an embodiment, the characterization system 120 may model or map the WA level and an effective over-provisioning percentage (e.g., a percentage of the logical capacity of a memory device and a raw capacity of the memory device). In an embodiment, the characterization system 120 can map the effective over-provisioning percentage to the NVB of the memory device, and this mapping can be used to determine the second relationship (i.e., the relationship between the NVB of the memory die and the WA of the memory device 130).

According to embodiments, the characterization system 120 determines a third relationship based on the first relationship (e.g., the throughput metric/WA relationship) and the second relationship (e.g., the WA associated with the throughput metric type/number of valid blocks (NVB) relationship). In an embodiment, the third relationship is determined between the throughput metric level associated with the memory device 130 and the number of valid blocks (NVB) of the memory device 130. In an embodiment, the third relationship may be modeled or plotted to represent the throughput metric level (e.g., plotted on a Y axis of a graph) and the NVB (e.g., plotted on an X axis of the graph). In an embodiment, a curve representing the third relationship may be modeled or plotted as a monotonically increasing curve.

In an embodiment, the characterization system 120 determines a largest or steepest slope or portion (i.e., the gradient of the throughput metric level and the number of NVB) along the curve corresponding to a threshold throughput loss level (e.g., a threshold percentage decrease of the throughput level). According to embodiments, the characterization system 120 identifies the portion of the curve having a steepest slope level corresponding to the threshold throughput loss level. According to embodiments, the portion of the curve having the steepest slope level corresponds to a loss of the throughput level equal to the threshold throughput loss level over a smallest range of the NVB.

According to embodiments, the characterization system 120 identifies a first NVB value (e.g., NVB X) corresponding to a start point of the identified portion of the curve (i.e., the steepest slope curve portion) and a second NVB value (e.g., NVB Y) corresponding to an end point of the identified portion of the curve. In an embodiment, the characterization system 120 determines a difference between the first NVB value and the second NVB value.

In an embodiment, the characterization process determines a range of the host system throughput that corresponds to a threshold throughput loss level. Using the identified range, the characterization process identifies a first NVB value corresponding to a start point of the range and a second NVB value corresponding to an end point of the range.

In an embodiment, the characterization system 120 determines a grown bad block (GBB) allowance associated with the memory device 130, 130N based on the difference between the first NVB value and the second NVB value. In an embodiment, the characterization system 120 stores the determined GBB allowance in a storage location associated with the memory device (e.g., stored as a trim value), where the memory device uses the grown bad block allowance during runtime.

Advantageously, the GBB allowance for each of the one or more memory devices 300 is defined based on performance requirements (e.g., customer target performance requirements) associated with the memory device 300 (e.g., memory die). Accordingly, establishing the GBB allowance value based on the performance requirements relationships, as described herein, results in an improved alignment between the memory device characterization and the runtime usage of the memory device. Further details with regards to the operations of the characterization system 120 are described below.

Figure 2:
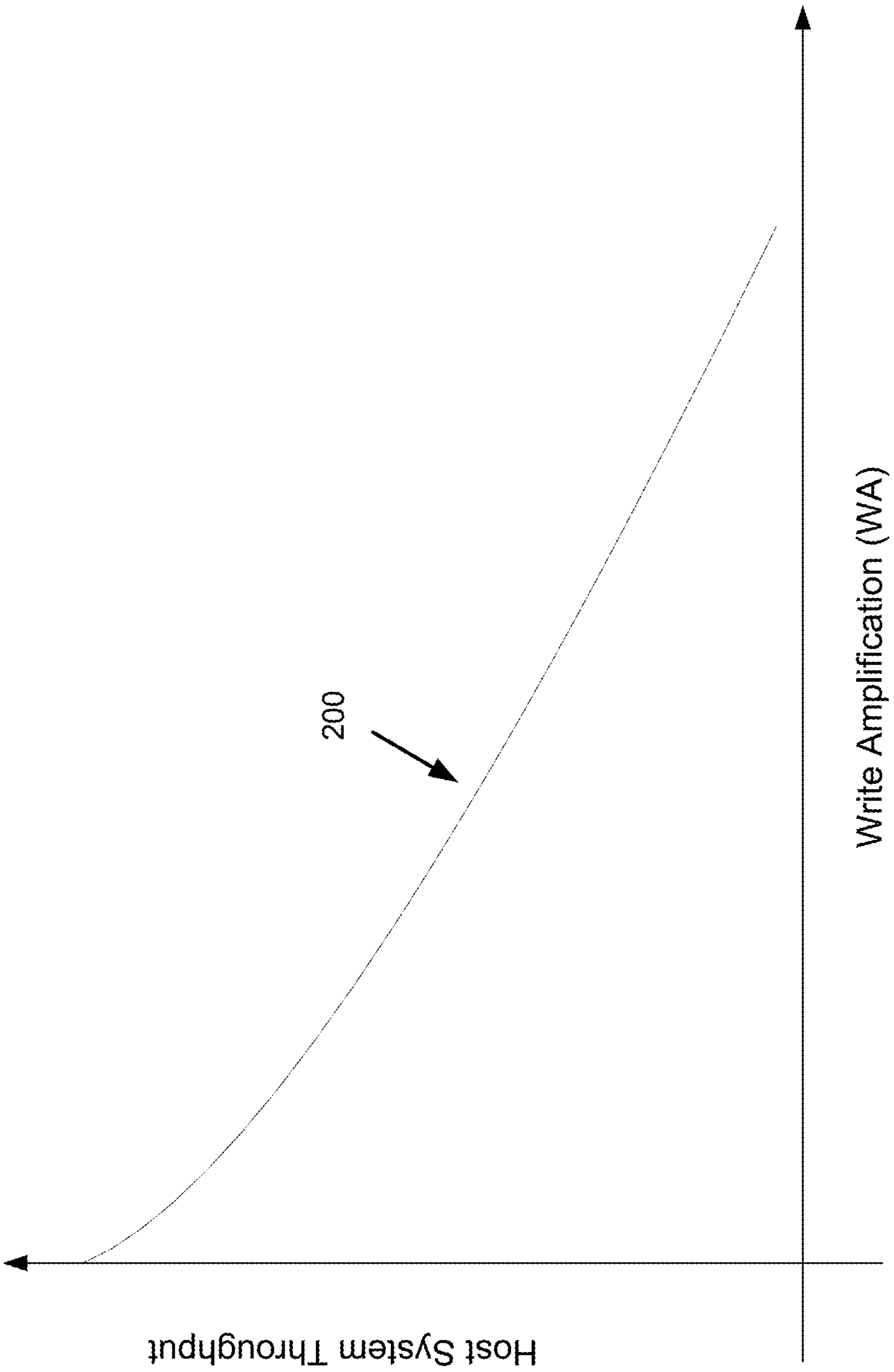
FIG. 2 depicts an example graph representing a first relationship associated with a memory device determined during a characterization process, in accordance with one or more embodiments of the present disclosure.

FIG. 2 is an example graph representing a first relationship 200 associated with a memory device (e.g., memory device 130 of FIG. 1) determined during a characterization process executed by a system (e.g., characterization system 120 of FIG. 1). In an embodiment, the first relationship 200 is a plot of a first parameter associated with the memory device and a second parameter associated with the memory device. In an embodiment, the first parameter and the second parameter are determined based on a set of target specification metrics associated with the memory device (i.e., target performance metrics required for the memory device during runtime of the memory device in order to satisfy target QoS levels). In an embodiment, the first parameter and the second parameter are performance metrics that are impacted by degradation during the runtime lifecycle (e.g., from beginning-of-life (BOL) to end-of-life (EOL)) of the memory device.

As illustrated in FIG. 2, the first relationship 200 is shown as a plotted curve of the host system throughput level (i.e., the first parameter) versus the write amplification (WA) level (i.e., the second parameter). According to embodiments, the first parameter and the second parameter can be identified by the characterization system based on one or more inputs associated with a set of performance requirements relating to the memory device.

In an embodiment, the first parameter is a throughput metric level corresponding to a memory access operation type. In an embodiment, the second parameter is a write amplification associated with the media access operation workload type associated with the throughput metric. The write amplification (WA) represents an actual amount of information or data written to a memory device compared to a logical amount of write data sent to the memory device by the host system. In an embodiment, the first parameter (i.e., the host system throughput level) is based on a memory access operation type. For example, the host system throughput level can be based on a 4K random write operation type (i.e., the host system throughput level represents a number of 4K random write operations a host system can request with respect to the memory device during a runtime lifetime of the memory device).

In an embodiment, the characterization system determines a first relationship 200 between the first parameter (e.g., the throughput metric associated with a media access operation workload type) and the second parameter (e.g., the WA associated with the media access operation workload type). For example, the first relationship 200 can representing the WA associated with the memory access operation type (e.g., a 4K random write WA level) and the host system throughput level can be determined in accordance with an equation, such as, for example:

$$\text{Host system throughput (for 4}K\text{ random write operations)} = \text{total backend throughput capability}/(2WA-1)$$

Figure 3:
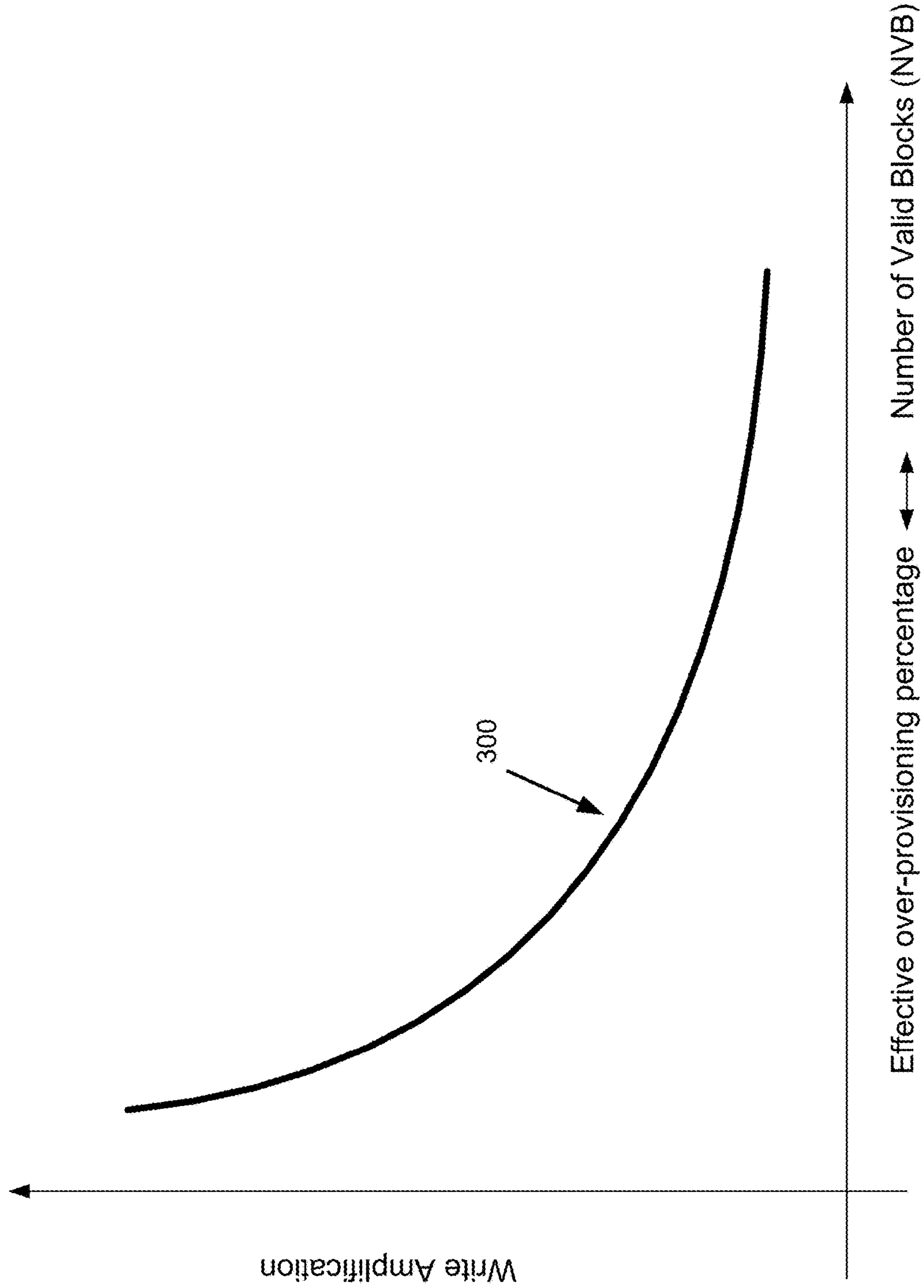
FIG. 3 depicts an example graph representing a second relationship associated with a memory device determined during a characterization process, in accordance with one or more embodiments of the present disclosure.

FIG. 3 illustrates an example graph representing a second relationship 300 associated with the memory device (e.g., memory device 130 of FIG. 1) determined during the characterization process executed by the characterization system. In an embodiment, the second relationship 300 is determined between a number of valid blocks (NVB) of the memory device and the WA (i.e., the WA associated with the media access operation workload type used to determine the first relationship 200 of FIG. 2) of the memory device. In an embodiment, the number of valid blocks represents a minimum number of memory blocks that are required to remain valid and capable of storing data in order to maintain target QoS requirements. In an embodiment, a modeling or mapping between the WA and an effective over-provisioning percentage (e.g., a percentage of the logical capacity of a memory device and a raw capacity of the memory device) may be established. In an embodiment, the effective over-provisioning (OP) percentage can be mapped to the NVB of the memory die, and this mapping can be used to determine the second relationship (i.e., the relationship between the NVB of the memory device and the WA of the memory device). In an embodiment, the relationship between the WA and the effective over-provisioning percentage can be determined according to an equation, such as, for example:

$$WA = C1 + C2/\text{effective over-provisioning percentage}$$

where coefficient 1 (C1) and coefficient 2 (C2) are determined based on the media access operation workload type used in determining the first relationship 200 (e.g., the 4K random write operation type). According to an embodiment, using a relationship 301, the effective over-provisioning (OP) percentage can be mapped to the NVB of the memory die, and this mapping can be used to determine the second relationship 300 (i.e., the relationship between the NVB of the memory device and the WA of the memory device) according to an equation, such as, for example:

$$\text{Effective } OP\ (\%) = ((\text{total space from } NVB \text{ of the memory device} - \text{space allocated for memory device internal usage})/\text{reported user space} - 1) * 100\%$$

Figure 4:
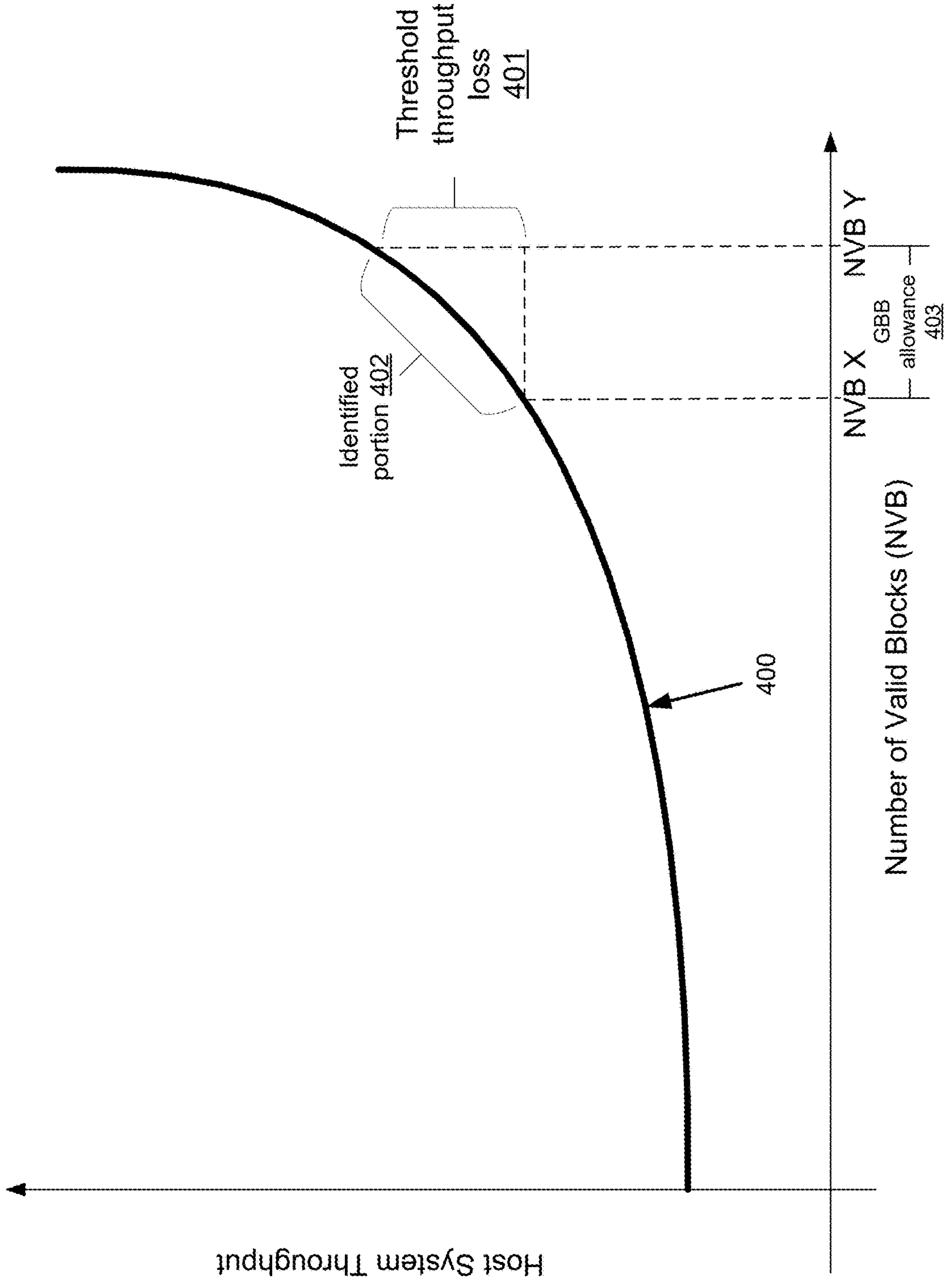
FIG. 4 depicts an example graph representing a third relationship associated with a memory device determined during a characterization process, where the third relationship is used to determine a grown bad block allowance associated with the memory device, in accordance with one or more embodiments of the present disclosure.

FIG. 4 illustrates an example graph representing a third relationship 400 associated with the memory device (e.g., memory device 130 of FIG. 1) determined during the characterization process executed by the characterization system. In an embodiment, the third relationship 400 can be determined based on the first relationship 200 and the second relationship 300. In an embodiment, the third relationship 400 can be determined using an additive operation based on the first relationship 200 and the second relationship 300.

As shown in FIG. 4, the third relationship 400 is a modeling of the throughput metric level (based on a selected media access operation workload type) associated with the memory device and the number of valid blocks (NVB) of the memory die. As shown in FIG. 4, the third relationship 400 may be modeled or plotted to represent the throughput metric (e.g., plotted on a Y axis of a graph) and the NVB (e.g., plotted on an X axis of the graph) as a monotonically increasing curve. In an embodiment, the curve representing the third relationship 400 is analyzed to determine a largest or steepest slope or portion 402 (i.e., the gradient of the throughput metric level and the number of NVB) along the curve corresponding to a threshold throughput loss level 401 (e.g., a percentage decrease of the throughput level). For example, the threshold throughput loss level 401 can be a percentage of throughput loss (e.g., a 10% loss of throughput) along the curve. In an embodiment, a portion of the curve having a steepest slope level 402 corresponding to the threshold throughput loss level 401 (i.e., the steepest slope level of the curve where a threshold throughput loss level 401) is identified (i.e., the identified portion 402 of FIG. 4). According to embodiments, the identified portion 402 of the curve represents the portion having the steepest slope level corresponding to a loss of the throughput level equal to the threshold throughput loss level 401 over a smallest range of the NVB.

In an embodiment, the characterization process determines a range 402 of the host system throughput that corresponds to a threshold throughput loss level. Using the identified range 402, the characterization process identifies a first NVB value corresponding to a start point of the range and a second NVB value corresponding to an end point of the range.

As shown in FIG. 4, having identified portion 402 (or range) corresponding to the threshold throughput loss level 401, the characterization system identifies a first NVB value (e.g., NVB X of FIG. 4) corresponding to a start point of the identified portion of the curve (i.e., the steepest slope curve portion) and a second NVB value (e.g., NVB Y of FIG. 4) corresponding to an end point of the identified portion 402 of the curve. In an embodiment, the characterization system determines a difference between the first NVB value and the second NVB value (e.g., NVB Y−NVB X). In an embodiment, the characterization system determines or establishes a grown bad block (GBB) allowance 403 associated with the memory device equal to the difference between the first NVB value and the second NVB value (e.g., GBB allowance=NVB Y−NVB X). In an embodiment, the determined GBB allowance 403 is stored in association with the memory device for use during the runtime of the memory device (i.e., stored and used as a requirement definition for the GBB allowance).

Advantageously, the GBB allowance 403 for the memory device is established based on performance requirements (e.g., host system throughput levels, WA, NVB, etc.) associated with the memory device (e.g., memory die) that are subject to degradation over the runtime lifetime of the memory device. Accordingly, establishing the GBB allowance value 403 based on the performance requirements relationships, as described herein, results in an improved alignment between the memory device characterization and the runtime usage of the memory device.

Figure 5:
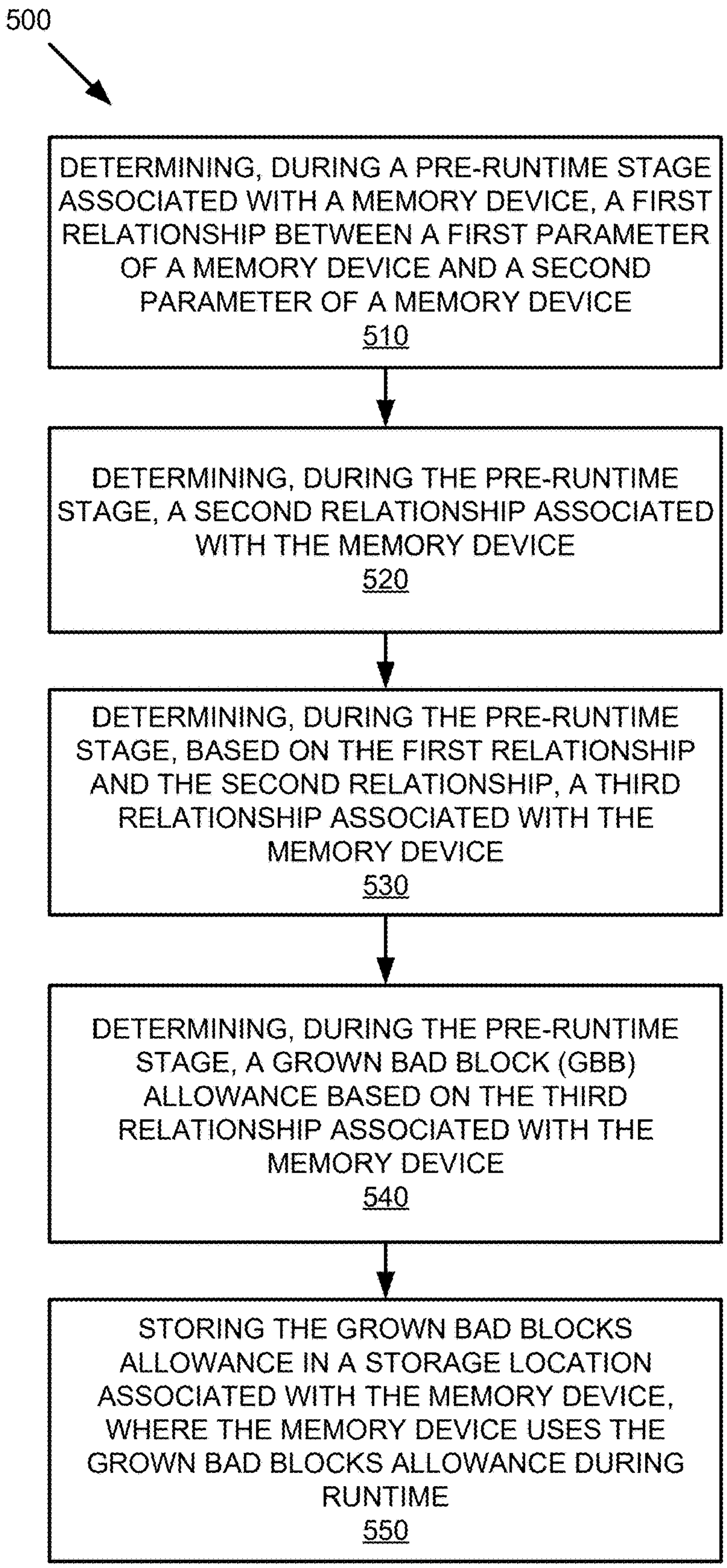
FIG. 5 is a flow diagram of an example method of determining, during a characterization process associated with a memory device, a grown bad block allowance associated with the memory device, in accordance with one or more embodiments of the present disclosure.

FIG. 5 is a flow diagram of an example method of determining, during characterization of a memory device, a GBB allowance for use during runtime implementation of the memory device, in accordance with one or more embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by characterization system 120 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic (e.g., processing logic of the characterization system 120 of FIG. 1) determines, during a characterization process, a first relationship between a first parameter of a memory device and a second parameter of the memory device. In an embodiment, the first parameter and the second parameter represent performance requirements or metrics associated with the memory device when implemented in a runtime environment (e.g., implemented in a memory sub-system operatively coupled to a host system). In an embodiment, the first parameter and the second parameter represent performance requirements that are subject to degradation during the runtime lifecycle (e.g., from a beginning-of-life (BOL) stage of the memory device to an end-of-life (EOL) stage of the memory device). In an embodiment, the first parameter includes a host system throughput corresponding to a media access operation workload type (e.g., a host system throughput associated with 4K random write operations). In an embodiment, the second parameter includes a write amplification (WA) level associated with the media access operation workload type. In an embodiment, the first relationship is a model or graph representing a function of the first parameter versus the second parameter. An example of the first relationship is shown in FIG. 2.

At operation 520, during the characterization process, the processing logic determines a second relationship associated with the memory device. In an embodiment, the second relationship is determined based on a modeling of a number of valid blocks (NVB) versus the WA corresponding to the media access operation type (i.e., the second parameter used in determining the first relationship in operation 510). An example of the second relationship is shown in FIG. 3.

At operation 530, during the characterization process, the processing logic determines, based on the first relationship and the second relationship, a third relationship associated with the memory device. In an embodiment, the third relationship represents a modeling of the host throughput level (e.g., the first parameter determined in operation 510) and the NVB level (e.g., the NVB level corresponding to the second relationship determined in operation 520. In an embodiment, the third relationship is modeled as a curve representing the host system throughput level as a function of the NVB level.

At operation 540, during the characterization process, the processing logic determines, a grown bad block (GBB) allowance based on the third relationship associated with the memory device. In an embodiment, the processing logic identifies a steepest portion of the curve representing the host system throughput level and the NVB level that corresponds to a threshold throughput loss or drop. In an embodiment, the processing logic examines the curve to identify one or more portions corresponding to the threshold throughput level drop (e.g., a predetermined or threshold percentage drop). In an embodiment, the processing logic identifies which of the one or more portions corresponding to the threshold throughput loss has a steepest (or largest slope). In an embodiment, the portion of the curve having steepest slope is identified as having a decrease in throughput level equal to the threshold throughput loss and a smallest relative change in the NVB level.

In an embodiment, in operation 540, having identified the portion of the throughput/NVB curve (i.e., the third relationship), the processing logic identifies a first NVB value corresponding to a start point of the identified portion of the curve (e.g., NVB X of FIG. 4) and a second NVB value corresponding to an end point of the identified portion of the curve (e.g., NVB Y of FIG. 4).

In an embodiment, the characterization process determines a range of the host system throughput that corresponds to a threshold throughput loss level. Using the identified range, the characterization process identifies a first NVB value corresponding to a start point of the range and a second NVB value corresponding to an end point of the range.

In an embodiment, in operation 540, the GBB allowance is determined by calculating a difference between the first NVB value and the second NVB value.

In operation 550, the processing logic stores the determined GBB allowance in a storage location associated with the memory device (e.g., stored as a trim value), where the memory device uses the grown bad block allowance during runtime.

Figure 6:
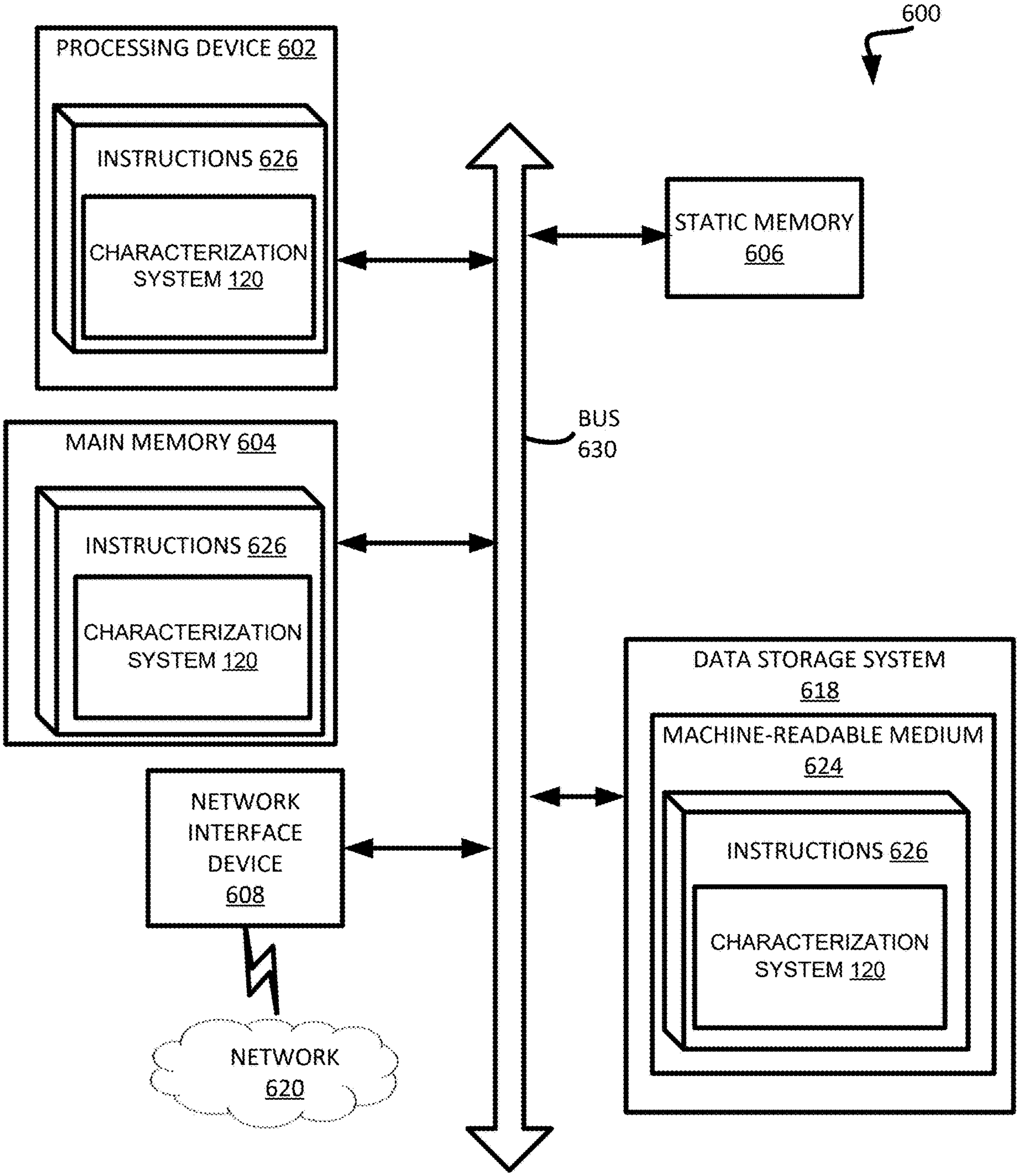
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a characterization system (e.g., the characterization system 120 of FIG. 1) that is configured to be coupled to one or more memory devices (e.g., memory device(s) 130 of FIG. 1) to perform operations during a characterization process associated with the memory device. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the characterization system 120 of FIG. 1.

In one embodiment, the instructions 626 include instructions to implement functionality corresponding to the characterization system 120 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

generating, by a processing device executing a model during a pre-runtime stage associated with a memory device, a first modeling of a first parameter of the memory device;

generating, by the processing device executing the model during the pre-runtime stage, a second modeling of a second parameter of the memory device;

determining, by the processing device during the pre-runtime stage associated with the memory device, a first relationship comprising the first modeling of the first parameter of the memory device and the second modeling of the second parameter of the memory device, wherein the first parameter corresponds to a first performance requirement associated with the memory device, and wherein the second parameter corresponds to a second performance requirement associated with the memory device;

determining, during the pre-runtime stage, a grown bad block allowance associated with the memory device, wherein the grown bad block allowance is equal to a difference between a first number of valid blocks value and a second number of valid blocks value determined based on the first relationship; and storing the grown bad block allowance in a storage location associated with the memory device, wherein a controller of the memory device accesses the storage location and uses the grown bad block allowance during runtime operation of the memory device.

2. The method of claim 1, wherein the first parameter comprises a host system throughput requirement associated with the memory device, and wherein the second parameter comprises a write amplification requirement associated with the memory device.

3. The method of claim 2, wherein the host system throughput requirement and the write amplification requirement are associated with a media access operation workload type.

4. The method of claim 2, further comprising:

determining, during the pre-runtime stage, a second relationship associated with the memory device; and determining, during the pre-runtime stage, based on the first relationship and the second relationship, a third relationship associated with the memory device, wherein the grown bad block allowance is determined based on the third relationship.

5. The method of claim 4, wherein the second relationship comprises the second modeling of the write amplification requirement and a number of valid blocks requirement associated with the memory device.

6. The method of claim 5, wherein the third relationship comprises a third modeling of the host system throughput requirement associated with the memory device and the number of valid blocks requirement associated with the memory device.

7. The method of claim 6, wherein determining the grown bad block allowance further comprises:

identifying a range of the host system throughput requirement corresponding to a threshold throughput loss level;

identifying the first number of valid blocks value associated with a start point of the range;

identifying the second number of valid blocks value associated with an end point of the range; and determining the difference between the first number of valid blocks value and the second number of valid blocks value.

8. A system comprising:

a memory comprising instructions; and a processing device, operatively coupled to the memory, to execute the instructions to perform operations comprising:

executing a model during a pre-runtime stage associated with a memory device to generate a first modeling of a first parameter of the memory device;

executing the model during the pre-runtime stage to generate a second modeling of a second parameter of the memory device;

determining, by the processing device during the pre-runtime stage associated with the memory device, a first relationship comprising the first modeling of the first parameter of the memory device and the second modeling of the second parameter of the memory device, wherein the first parameter corresponds to a first performance requirement associated with the memory device, and wherein the second parameter corresponds to a second performance requirement associated with the memory device;

determining, during the pre-runtime stage, a grown bad block allowance associated with the memory device, wherein the grown bad block allowance is equal to a difference between a first number of valid blocks value and a second number of valid blocks value determined based on the first relationship; and storing the grown bad block allowance in a storage location associated with the memory device, wherein a controller of the memory device accesses the storage location and uses the grown bad block allowance during runtime operation of the memory device.

9. The system of claim 8, wherein the first parameter comprises a host system throughput requirement associated with the memory device, and wherein the second parameter comprises a write amplification requirement associated with the memory device.

10. The system of claim 9, wherein the host system throughput requirement and the write amplification requirement are associated with a media access operation workload type.

11. The system of claim 9, the operations further comprising:

determining, during the pre-runtime stage, a second relationship associated with the memory device; and determining, during the pre-runtime stage, based on the first relationship and the second relationship, a third relationship associated with the memory device, wherein the grown bad block allowance is determined based on the third relationship.

12. The system of claim 11, wherein the second relationship comprises a second modeling of the write amplification requirement and a number of valid blocks requirement associated with the memory device.

13. The system of claim 12, wherein the third relationship comprises a third modeling of the host system throughput requirement associated with the memory device and the number of valid blocks requirement associated with the memory device.

14. The system of claim 13, wherein determining the grown bad block allowance further comprises:

identifying a range of the host system throughput requirement corresponding to a threshold throughput loss level;

identifying the first number of valid blocks value associated with a start point of the range;

identifying the second number of valid blocks value associated with an end point of the range; and determining the difference between the first number of valid blocks value and the second number of valid blocks value.

15. A non-transitory computer-readable storage medium comprising instructions that, when executed by a processing device, cause the processing device to perform operations comprising:

executing a model during a pre-runtime stage associated with a memory device to generate a first modeling of a first parameter of the memory device;

executing the model during the pre-runtime stage to generate a second modeling of a second parameter of the memory device;

determining, by the processing device during the pre-runtime stage associated with the memory device, a first relationship comprising the first modeling of the first parameter of the memory device and the second modeling of the second parameter of the memory device, wherein the first parameter corresponds to a first performance requirement associated with the memory device, and wherein the second parameter corresponds to a second performance requirement associated with the memory device, determining, during the pre-runtime stage, a grown bad block allowance associated with the memory device, wherein the grown bad block allowance is equal to a difference between a first number of valid blocks value and a second number of valid blocks value determined based on the first relationship; and storing the grown bad block allowance in a storage location associated with the memory device, wherein a controller of the memory device accesses the storage location and uses the grown bad block allowance during runtime operation of the memory device.

16. The non-transitory computer-readable storage medium of claim 15, wherein the first parameter comprises a host system throughput requirement associated with the memory device, and wherein the second parameter comprises a write amplification requirement associated with the memory device.

17. The non-transitory computer-readable storage medium of claim 16, wherein the host system throughput requirement and the write amplification requirement are associated with a media access operation workload type.

18. The non-transitory computer-readable storage medium of claim 17, the operations further comprising:

determining, during the pre-runtime stage, a second relationship associated with the memory device; and determining, during the pre-runtime stage, based on the first relationship and the second relationship, a third relationship associated with the memory device, wherein the grown bad block allowance is determined based on the third relationship.

19. The non-transitory computer-readable storage medium of claim 18, wherein the second relationship comprises the second modeling of the write amplification requirement and a number of valid blocks requirement associated with the memory device; and wherein the third relationship comprises a third modeling of the host system throughput requirement associated with the memory device and the number of valid blocks requirement associated with the memory device.

20. The non-transitory computer-readable storage medium of claim 19, wherein determining the grown bad block allowance further comprises:

identifying a range of the host system throughput requirement corresponding to a threshold throughput loss level;

identifying the first number of valid blocks value associated with a start point of the range;

identifying the second number of valid blocks value associated with an end point of the range; and determining the difference between the first number of valid blocks value and the second number of valid blocks value.

* * * * *